(12) United States Patent
Hwang

(10) Patent No.: US 11,092,937 B2
(45) Date of Patent: Aug. 17, 2021

(54) ELECTRIC PRODUCT

(71) Applicant: LG ELECTRONICS INC., Seoul (KR)

(72) Inventor: Jinseong Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 283 days.

(21) Appl. No.: 14/753,547

(22) Filed: Jun. 29, 2015

(65) Prior Publication Data

US 2016/0179067 A1 Jun. 23, 2016

(30) Foreign Application Priority Data

Dec. 22, 2014 (KR) .......................... 10-2014-0185879

(51) Int. Cl.
*G05B 15/02* (2006.01)
*H04W 4/80* (2018.01)
*G08C 17/00* (2006.01)

(52) U.S. Cl.
CPC ............. *G05B 15/02* (2013.01); *G08C 17/00* (2013.01); *H04W 4/80* (2018.02); *G08C 2201/93* (2013.01)

(58) Field of Classification Search
USPC ........................................................ 700/40
See application file for complete search history.

(56) References Cited

U.S. PATENT DOCUMENTS 6,426,705 B1 7/2002 Wischoeffer
7,110,836 B2 * 9/2006 Sturm .................... G08C 17/00
340/3.31
(Continued)

FOREIGN PATENT DOCUMENTS

CN 102368933 3/2012
CN 103502522 1/2014
(Continued)

OTHER PUBLICATIONS

Pilkington, "Control these large smart appliances with your iPhone" cnet (https://www.cnet.com/news/control-these-large-smart-appliances-with-your-iphone/) Sep. 10, 2013.*
(Continued)

*Primary Examiner* — Emilio J Saavedra
(74) *Attorney, Agent, or Firm* — KED & Associates LLP

(57) ABSTRACT

An electric product comprises a control object to allow the electric product to operate in one of a plurality of operational modes, the plurality of operational modes comprising a first group of operational modes and a second group of operational modes; a memory to store information corresponding to the plurality of operational modes; a user interface only allowing selection of the first group of operational modes such that the user interface does not allow selection of the second group of operational modes; a communication module configured receive a start command through a prescribed communication method for a first prescribed operational mode, the first prescribed operational mode being an operational mode of at least one of the first group of operational modes or the second group of operational modes; and a controller to control the control object so that the electric product operates in the first prescribed operational mode.

7 Claims, 6 Drawing Sheets

(56) References Cited

U.S. PATENT DOCUMENTS

| | | | | |
|---|---|---|---|---|
| 2002/0011072 A1* | 1/2002 | Hiraoka | ............ | F25D 11/02 |
| | | | | 62/126 |
| 2004/0256378 A1* | 12/2004 | Shukla | ............ | F24C 7/082 |
| | | | | 219/490 |
| 2008/0282897 A1* | 11/2008 | Webster | ............ | A47J 31/56 |
| | | | | 99/280 |
| 2011/0271984 A1* | 11/2011 | Ireland | ............ | A47L 15/0021 |
| | | | | 134/18 |
| 2013/0264383 A1* | 10/2013 | Ko | ............ | G06F 17/30 |
| | | | | 235/375 |
| 2014/0226817 A1* | 8/2014 | Von Huben | ............ | H04L 61/35 |
| | | | | 380/270 |
| 2014/0277774 A1* | 9/2014 | McKinzie | ............ | B05B 12/02 |
| | | | | 700/282 |
| 2015/0232210 A1* | 8/2015 | Sung | ............ | B29C 66/91651 |
| | | | | 53/509 |

FOREIGN PATENT DOCUMENTS

| | | | |
|---|---|---|---|
| CN | 103685451 | | 3/2014 |
| EP | 2 706 138 | | 3/2014 |
| JP | 2003083960 A | * | 3/2003 |
| KR | 10-2005-0004616 A | | 1/2005 |
| KR | 20080067156 A | * | 7/2008 |
| KR | 10-2011-0138812 A | | 12/2011 |
| KR | 10-2014-0089840 A | | 7/2014 |
| WO | WO 2013/190816 | | 12/2013 |
| WO | WO-2013190816 A1 | * | 12/2013 ............. D06F 33/02 |

OTHER PUBLICATIONS

Crist, "Up close with Samsung's DV457 Dryer (hands-on)" cnet (https://www.cnet.com/products/samsung-dv457-electric-dryer/preview/) Sep. 8, 2013.*

General Electric Company, "Simon XT User Manual" 2007, 60 pgs. (Year: 2007).*

NXP, "NTAG I2C Washing Machine and Thermostat Demo CES 2014" Video demonstration accessed at https://www.youtube.com/watchPvsypE-IBUJI.fO 11 minutes 53 seconds, Feb. 5, 2014 (25 pg. pdf) (Year: 2014).*

Korean Office Action dated Feb. 4, 2016 issued in Application No. 10-2014-0185879.

European Search Report dated May 10, 2016 issued in Application No. 15170240.4.

Chinese Office Action dated Sep. 3, 2018 issued in Application No. 201510178364.3 (English Translation attached).

* cited by examiner

ELECTRIC PRODUCT

CROSS-REFERENCE TO RELATED APPLICATION

The present application claims priority under 35 U.S.C. § 119 to Korean Patent Application No. 10-2014-0185879 filed on Dec. 22, 2014, the entire disclosure of which is hereby incorporated by reference.

BACKGROUND

1. Field

The present disclosure relates to an electric product.

2. Background

In general, electric products are apparatuses that automatically operate without receiving a specific command or inputting a command such as refrigerators, washing machines, cleaners, cookers, and the like. A network system and energy consumption component are disclosed in Korean Patent Publication No. 2011-0138812 (Published Date: Dec. 28, 2011) that is a related art.

In the related art, a washing machine is described as an example of the energy consumption component. The washing machine includes a control panel. The control panel includes a function section unit including a power button, an operation button, a mode or course selection part, and a plurality of buttons and a display unit.

According to the control panel, since a user has to select various buttons to operate a washing machine once, the user may feel cumbersome. Although the actual user mainly selects a specific course of a plurality of courses, the user has to be able to select all of the plurality of courses, buttons having less frequency in use has to be also provided on the control panel. Thus, the control panel may be complicated in structure, increase in manufacturing costs, and be deteriorated in outer appearance of the washing machine. The above-limitations may occur in various electric products including various buttons as well as the washing machine.

BRIEF DESCRIPTION OF THE DRAWINGS

The embodiments will be described in detail with reference to the following drawings in which like reference numerals refer to like elements wherein.

DETAILED DESCRIPTION

Figure 1:
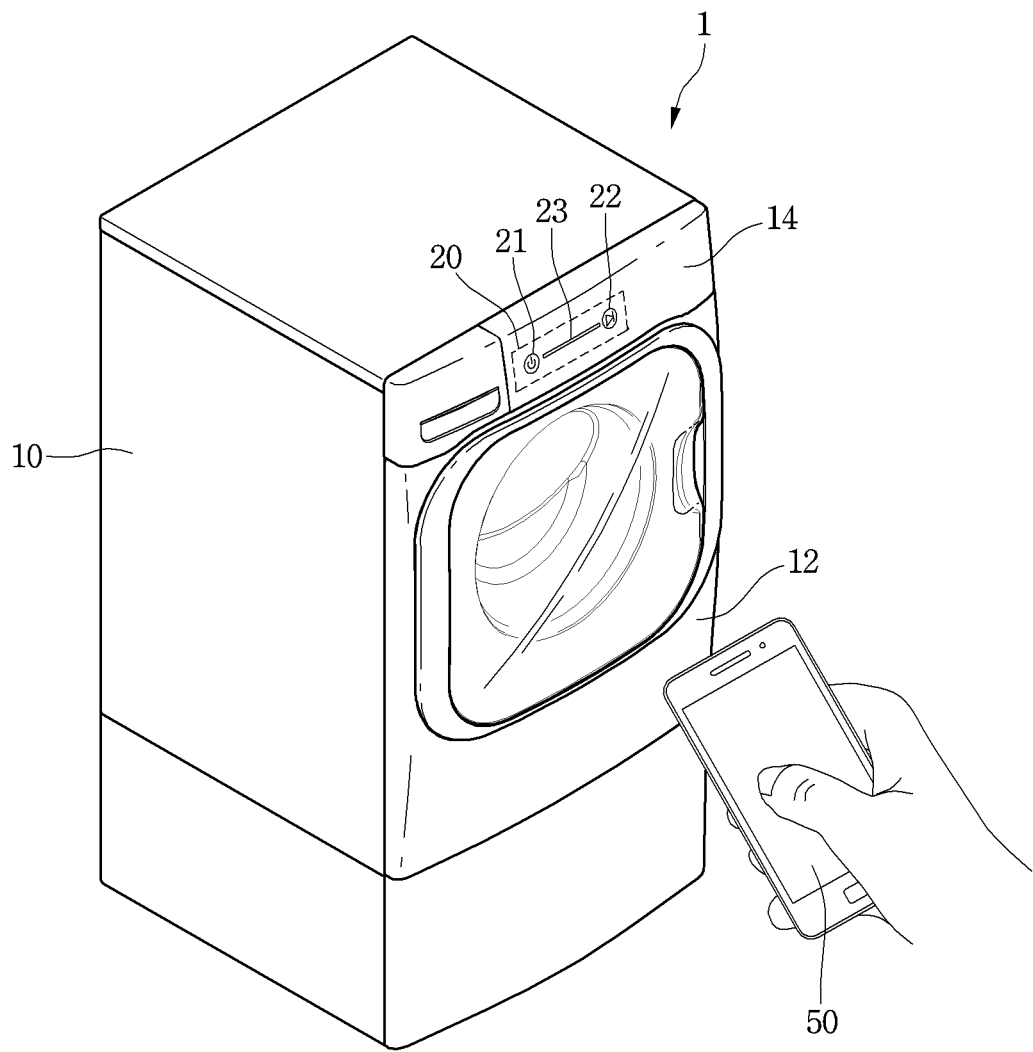
FIG. 1 is a view of an electric product according to an embodiment.
Figure 2:
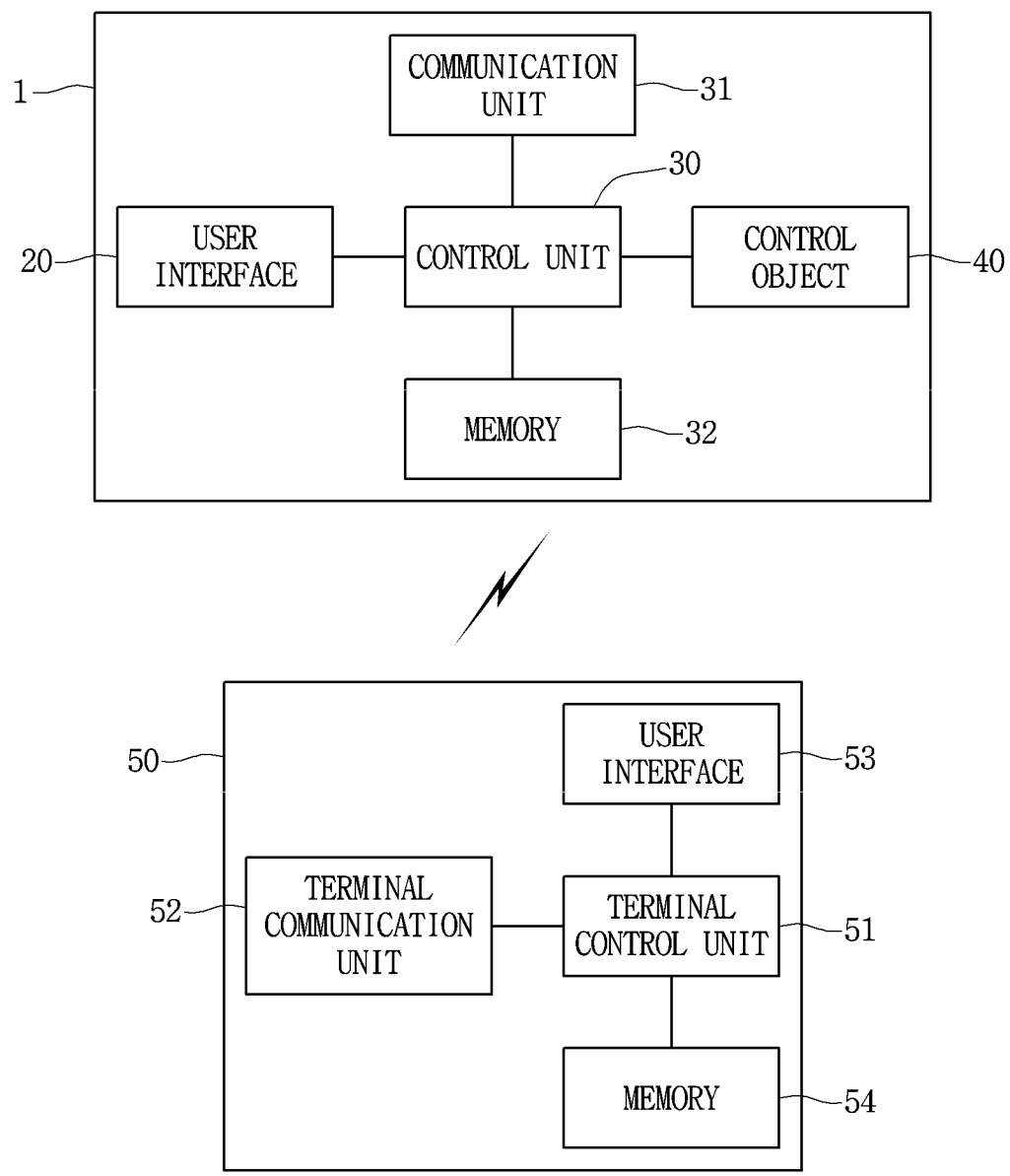
FIG. 2 is a block diagram of an electric product and a mobile terminal that is an example of an external device that is communicable with the electric product.

FIG. 1 is a view of an electric product according to an embodiment, and FIG. 2 is a block diagram of an electric product and a mobile terminal that is an example of an external device that is communicable with the electric product. An electric product 1 may be communicable with an external device. Although a mobile terminal 50 is described as an example of the external device, the present disclosure is not limited thereto. For example, different types of external devices are communicable with the electric product 1. For example, the electric product 1 may be communicable with personal computers, other electric products, and the like. Although a washing machine is described as an example of the electric product 1, the current embodiment may be equally applied to other electric products.

The electric product 1 may include a cabinet 10 defining an outer appearance thereof and a door 12 for opening and closing an inner space of the cabinet 10. A front panel 14 may be disposed on a front portion of the cabinet 10. A user interface 20 for inputting a command to the electric product 1 or displaying information of the electric product 1 may be provided on the front panel 14. The user interface 20 may not be limited in position.

The user interface 20 may include a power button 21 for turning a power of the electric product 1 on/off. The user interface 20 may further include a start button 22 for inputting a start command for stating an operation of the electric product 1 or inputting a command for stopping the operation of the electric product 1 during the operation of the electric product 1. The user interface 20 may further include a display unit 23 for displaying an operation state of the electric product 1 during the operation of the electric product 1.

If the electric product 1 is a washing machine, the washing machine may perform a washing process, a rinsing process, and a dehydrating process. For example, information distinguished for each process may be displayed on the display unit 23.

For example, the display unit 23 may include at least three light emitting parts. When the washing machine performs the washing process, a first light emitting part of the three light emitting parts may be turned on. When the washing machine performs the rinsing process, a second light emitting part of the three light emitting parts may be turned on. When the washing machine performs the dehydrating process, a third light emitting part of the three light emitting parts may be turned on.

For another example, the display unit 23 includes at least one light emitting part. Here, a color of light emitted from the light emitting part for each process, the number of light emitting parts that are turned on, and intensity of light emitted from the light emitting part may be different. As illustrated, a complex display is not required, and in some instances, even the light emitter may be omitted.

The display unit 23 may be provided separately from the power button 21 and the start button 22. Alternatively, the power button 21 or the start button 22 may function as the display unit. A light emitting part for emitting light serves as the power button 21 or start button 22. The light emitted from the light emitting part may change in color according to each of the processes. Alternatively, the display unit 23 may not display the operation state of the electric product 1, but display a residual time until the operation of the electric product 1 is stopped.

The electric product 1 may further include a communication unit or module 31 for communicating with a mobile terminal 50. The communication unit 31 may directly communicate with the mobile terminal 50 or communicate with the mobile terminal 50 through an external server. The external server may include a server of a manufacturer that manufactures the electric product 1 or a server of a service center for the electric product 1, but is not limited thereto. The communication unit 31 may perform the communication by using various communication manners such as Wifi, Zig-bee, Bluetooth, internet, near field communication (NFC). This specification is not limited to the communication manners of the communication unit 31.

The electric product 1 may further include an object 40 to be controlled (hereinafter, referred to as a control object) and a control unit or controller 30 for controlling the control object 40. The control object 40 may include all of objects to be controlled by the control unit 30 or the external device, such as a drum motor for rotating a drum provided in the electric product 1, a water supply valve for controlling supply of water, a drain valve for controlling draining of water, a heater for heating water, a fan motor for blowing air, and the like even though the objects are not described in this specification.

The control object 40 may be different according to kinds of electric products. For example, when the electric product is a refrigerator, the control object 40 may include at least one of a fan motor, various components for forming a refrigeration cycle, a compressor, a driving unit for driving a dispenser, various valves for controlling flow of water or ices, a damper for switching a flow of air or cool air, and a heater for providing heat.

When the electric product is a cooker, the control object may include at least one of a heating source, a fan motor, and a turn table motor. When the electric produce is a water purifier, the control object may include at least one of various components for forming a refrigeration cycle, a valve for controlling a flow of water or ices, and a pump.

The control object 40 may allow the electric product 1 to operate in various manners. The electric product 1 may include a memory 32 in which various control methods for controlling the control object 40, i.e., a plurality of operation methods for the electric product 1 are stored.

For example, when the electric product 1 is the washing machine, the electric product 1 may perform at least one of various courses such as a standard course, a wool course, and a steam course. The plurality of courses may correspond to the plurality of operation methods, respectively.

In case of the same course, the operation method may be different according to detailed options such as the number of rinsing, a water temperature, and an intensity of dehydrating. The detailed options different from each other may correspond to the plurality of operation methods. When the operation methods are different from each other, operation times may be different from each other. The plurality of operation methods may be stored in the memory 32. One operation method of the plurality of operation methods may be set as a reference operation method and then stored in the memory 32.

The control unit 30 may control the electric product 1 to operate in one operation method of the plurality of operation methods stored in the memory 32. The control unit 30 of the electric product 1 may operate the control object 40 in one operation method of the plurality of operation methods stored in the memory 32.

However, although the electric product 1 may operate in one operation method of the plurality of operation methods in the current embodiment, the user interface 20 of the electric product 1 may prevent other operation methods except for the one operation method from being selected. The plurality of operation methods of the electric product 1 may be selected through the mobile terminal 50. The electric product 1 may receive the operation method selected through the mobile terminal 50 to operate in the received operation method.

The mobile terminal 50 may include a terminal communication module 52 that is capable of communicating with the communication unit 31, a memory 54, and a terminal control unit or controller 51. The mobile terminal 50 may further include a user interface 53 for displaying information of the mobile terminal 50 itself and inputting a command for operating the mobile terminal 50 as well as for inputting an operation command of the electric product 1 and displaying a state of the electric product 1.

One method of the plurality of operation methods stored in the memory 32 of the electric product 1 may be selected through the user interface 53. The selected method may be transmitted to the electric product 1. The operation method that is capable of being selected through the mobile terminal 50 may include the reference operation method stored in the memory 32 of the electric product 1.

Figure 3:
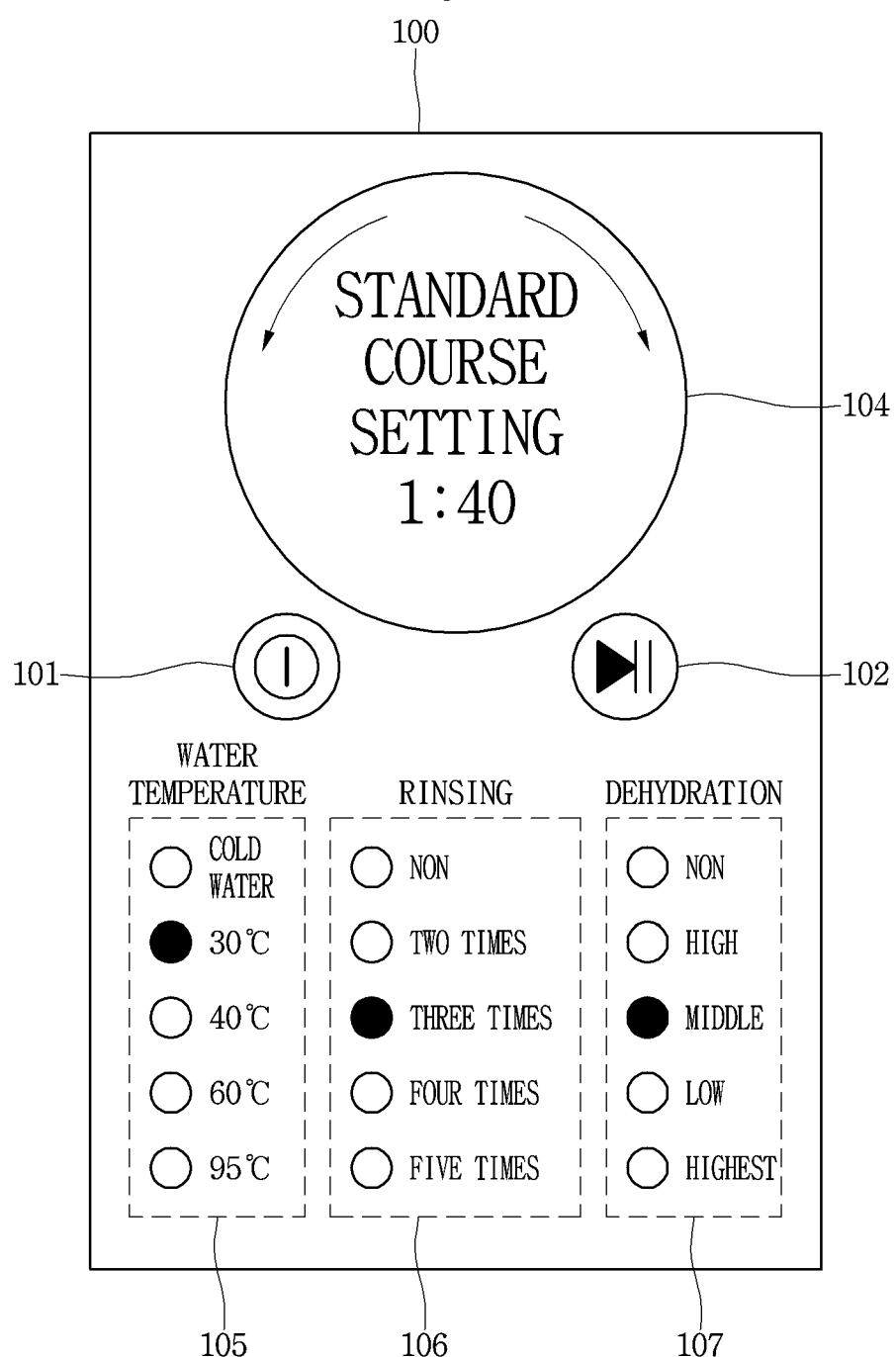
FIGS. 3 and 4 are views of a screen displayed on a user interface of the mobile terminal of FIG. 2.
Figure 4:
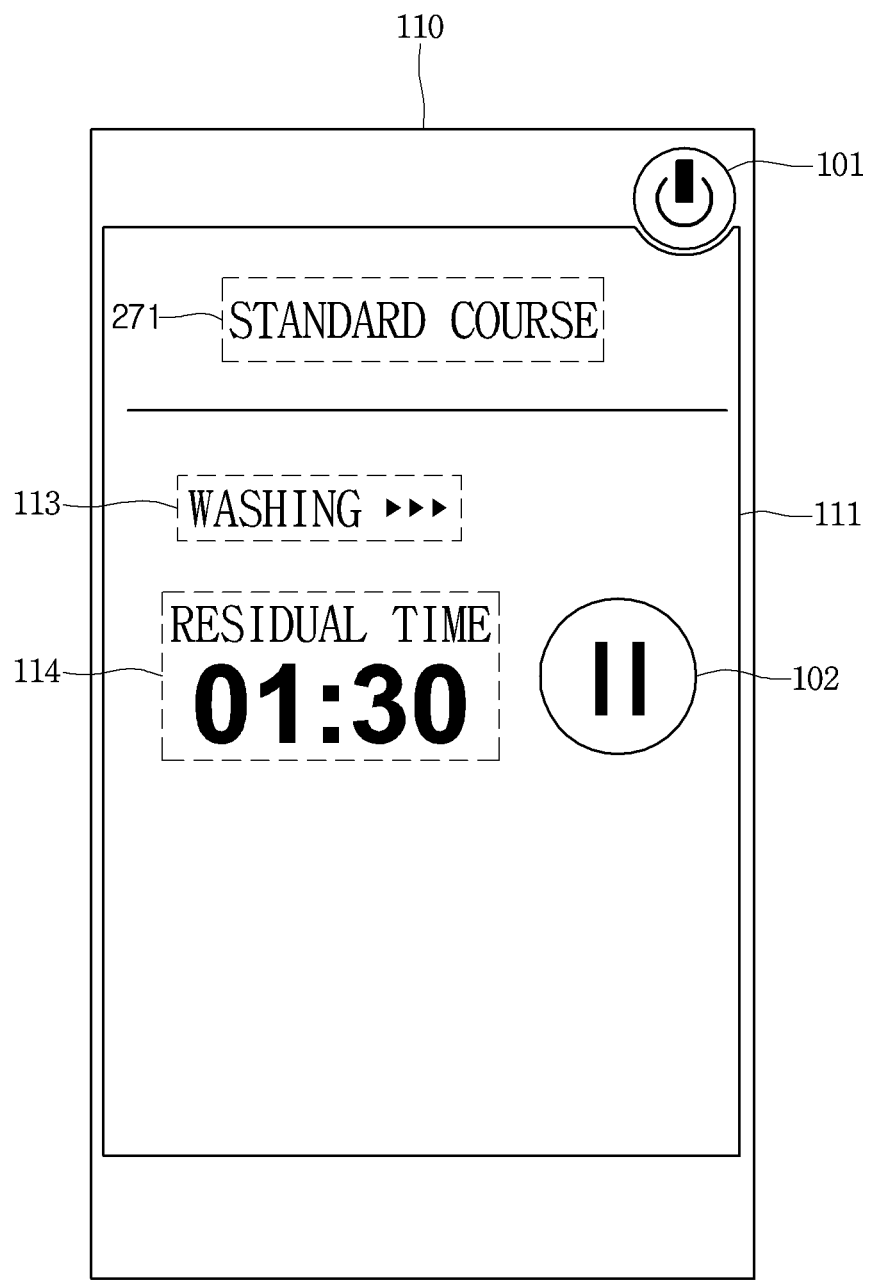

FIGS. 3 and 4 are views of a screen displayed on the user interface of the mobile terminal of FIG. 2. FIG. 3 illustrates a selection screen for selecting an operation method of the electric product, and FIG. 4 illustrates a monitoring screen for monitoring a state of the electric product.

Referring to FIG. 3, a selection screen 100 for selecting an operation method of the electric product 1 may be displayed on the user interface 53 of the mobile terminal 50. A power button 101 for turning a power of the electric product 1 on or off and a start button 102 for stating or temporarily stopping an operation of the electric product 1 may be displayed on the selection screen 100.

A course selection part or interface 104 for selecting a course to be performed by the electric product 1 may be displayed on the selection screen 100. For example, the course selection part 104 may be displayed in the form of a dial. The user may rotate the dial in a state where the user touches the dial to select one course of the plurality of courses. The present disclosure is not limited to the method for selecting the course by using the course selection part 104.

A water temperature selection part or interface 105 for selecting a water temperature may be further displayed on the selection screen 100. The water temperature selection part or interface 105 may include a plurality of individual selection parts that are selected for each temperature. The present disclosure is not limited to a method for selecting the water temperature by using the water temperature selection part 105.

A rinsing number selection part or interface 106 for selecting the rinsing number may be further displayed on the selection screen 100. The rinsing number selection part 106 may include a plurality of individual selection parts that are capable of being selected for each of the rinsing numbers. The rinsing number selection part 106 may further include a selection part for selecting non-rinsing. The present disclosure is not limited to a method for selecting the rinsing number by using the rinsing number selection part 106.

A dehydration intensity selection part or interface 107 for selecting the intensity of the dehydration may be further displayed on the selection screen 100. The dehydration intensity selection part 107 may include a plurality of individual selection parts that are selected for each intensity of the dehydration. The dehydration intensity selection part 107 may further include a selection part for selecting non-dehydration. The present disclosure is not limited to the method for selecting the dehydration intensity by using the water temperature selection part 107.

In this specification, the water temperature, the rinsing number, and the dehydration intensity may be the detailed option of the course that is performed by the electric product. If the detailed option is different, the operation method of the electric product may be different even though the same course is performed. In the current embodiment, the detailed option may be a determination factor for determining the operation method of the electric product. The course selected by the course selection part may be a determination factor for determining the operation method.

The user may select at lest one determination factor for determining the operation method of the electric product by using the mobile terminal to select one operation method (including the reference operation method) of the plurality of operation methods of the electric product.

When the start button 102 is selected after the determination factor is determined on the selection screen of FIG. 3, the mobile terminal 50 may transmit one operation method of the electric product according to the determined determination factor together with the start command of the electric product 1. Thus, the electric product 1 may receive the one operation method from the mobile terminal.

Referring to FIG. 4, a monitoring screen 110 for monitoring a state of the electric product 1 may be disposed on the user interface 53 of the mobile terminal 50. An operation state display part or interface 111 for displaying an operation state of the electric product may be displayed on the monitoring screen 110. The power button 101 may be displayed on the monitoring screen 110. The power button 101 may be displayed separately from the operation state display part 111 and displayed on the operation state display part 111.

The operation state display part may include at least one of a course display part or interface 271 for display a course, a process display part or interface 113 for displaying the current process, and a residual time display part or interface 114 for displaying a residual time till the ending time. The operation state display part 111 may include the start button 102. When the start button 102 is selected in the state where the electric product 1 operates, the electric product may be temporarily stopped.

Figure 5:
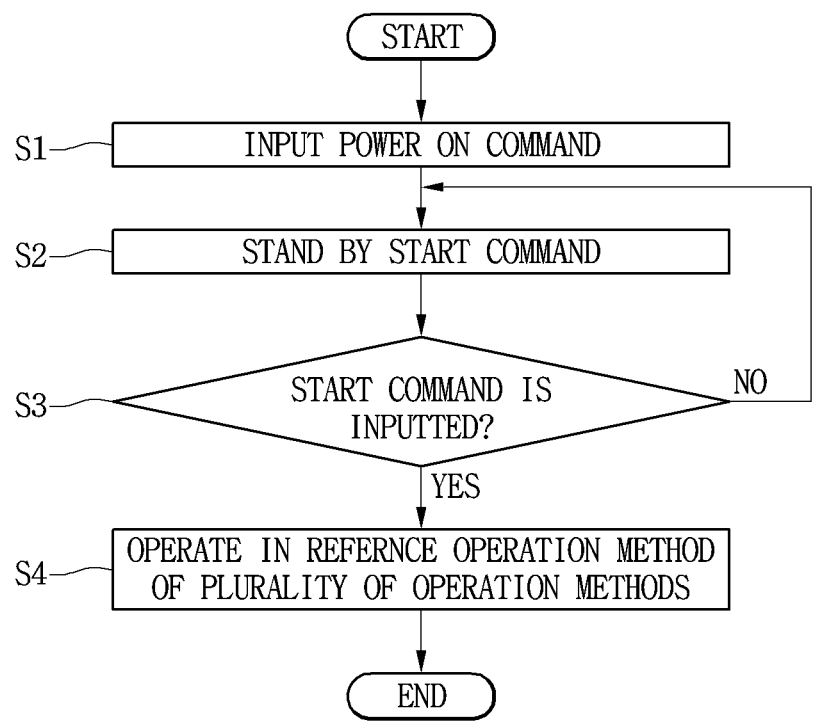
FIG. 5 is a flowchart for explaining a method for controlling the electric product according to an embodiment, i.e., a flowchart in a case in which a start command is inputted from a user interface of the electric product.

FIG. 5 is a flowchart for explaining a method for controlling the electric product according to an embodiment, i.e., a flowchart in a case in which a start command is inputted from the user interface of the electric product.

Referring to FIGS. 2 and 5, in operation S1, a power turn-on command is inputted into the electric product 1. The power turn-on command may be inputted by allowing the user to select a power button 21 of the electric product 1.

In operation S2, when the power button 21 is selected, the control unit 30 of the electric product 1 stands by an input of a start command. In a state of the input standby state of the start command, the control unit 30 of the electric product 1 determines whether the start command is inputted in operation S3. The start command may be inputted by allowing the user to select the start button 22.

If it is determined that the start command is inputted according to the determination result in the operation S3, the control unit 30 of the electric product 1 controls the electric product 1 so that the electric product 1 operates in a reference operation method of a plurality of operation methods stored in the memory 32. In operation S4, the control unit 30 of the electric product 1 may control the control object 40 so that the control object 40 operates in the reference operation method.

The display unit 23 may display a changing state when the electric product 1 operates in the reference operation method. According to the current embodiment, the user may not select an operation method of the electric product 1, but select the start button 22 to allow the electric product 1 to operate in the reference operation method.

In this specification, the reference operation method represents, for example, a method in which the electric product 1 operates in a standard course. However, the standard course may be previously decided by the manufacturer. Even if the same product is used, detailed options (rinsing number or whether the rinsing is performed, a water temperature, and dehydration intensity or whether dehydrating is performed) may be different according to the specification of the product.

A pattern for setting an operation method of the electric product by the user may vary. In general, only a portion of the plurality of operation methods may be selected. Thus, in the current embodiment, the buttons for selecting an operation method having a low frequency of use may be removed from the user interface. On the other hand, the electric product may operate in an operation method that is frequently or mostly used. When the start button is selected, the electric product may operate in the reference operation method.

Since the electric product includes the minimum number of buttons, the user interface may be simplified in structure. Costs for manufacturing a structure (e.g., PCB or a structure for installing the buttons) for realizing the user interface may be reduced. In addition, since the minimum number of buttons is exposed to the outside, the outer appearance of the front surface may be clean.

When the start command is inputted regardless of usage numbers of the electric product until the reference operation method changes into a manual method, the electric product may operate in the reference operation method. The reference operation method selected when the start command is inputted may manually change or be set by the user. The change of the reference operation method may be performed through the mobile terminal.

The electric product may receive the changed reference operation method from the mobile terminal 50 to store the changed reference operation method in the memory 32. When the communication unit 31 of the electric product 1 receives a changing command of the reference operation method from the external device, the changed reference operation method may be stored in the memory 32. Thus, when the start command is inputted later through the user interface 20 of the electric product 1, the electric product 1 may operate the changed reference operation method.

Figure 6:
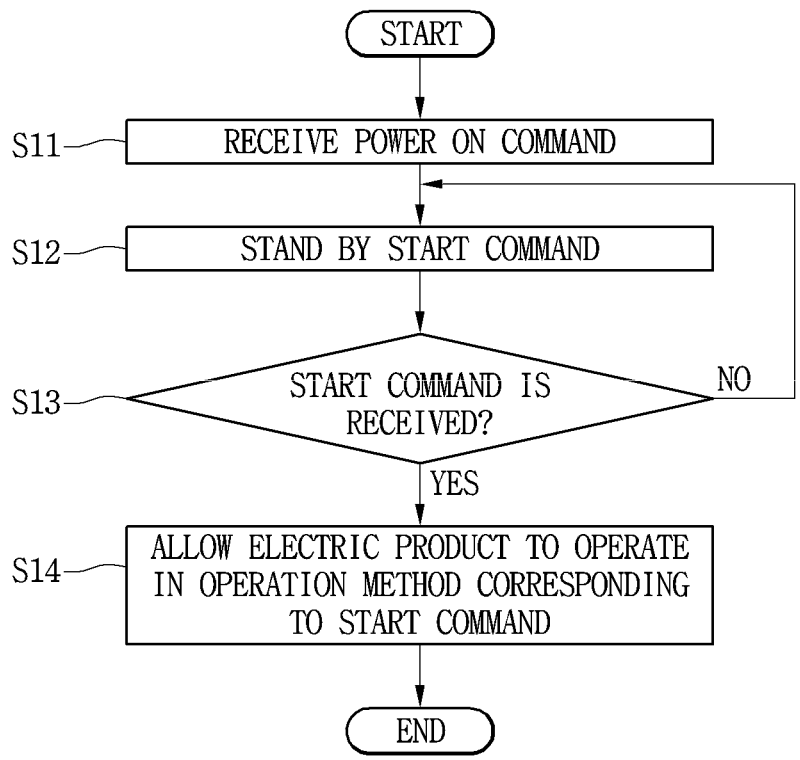
FIG. 6 is a flowchart for explaining a method for controlling the electric product according to an embodiment, i.e., a flowchart in a case in which a start command is received from the user interface of the mobile terminal.

FIG. 6 is a flowchart for explaining a method for controlling the electric product according to an embodiment, i.e., a flowchart in a case in which a start command is received from the user interface of the mobile terminal. Referring to FIGS. 2 and 6, in operation S11, the electric product 1 may receive a power turn-on command from the mobile terminal 50. When the electric product 1 receives the power turn-on command, the electric product 1 is turned on.

In the state where the electric product 1 is turned on, the control unit 30 of the electric product 1 stands by an input of a start command in operation S12.

Based on the state of the input standby state of the start command, the control unit 30 of the electric product 1 determines whether the start command is received in operation S13. The start command may include an operation method selected from the mobile terminal 50 to operate the electric product.

As described above, the reference operation method of the plurality of operation methods may be selected through the mobile terminal 50, and the other operation method in addition to the reference operation method may be selected.

If it is determined that the start command is inputted according to the determination result in the operation S13, the control unit 30 of the electric product 1 controls the electric product 1 so that the electric product 1 operates in the received operation method in operation S14. The control unit 30 of the electric product 1 may control the control object 40 so that the control object 40 operates in the received operation method. The display unit 23 may display a changing state when the electric product operates in the received operation method.

When the operation of the electric product 1 is completed in the received operation method, the electric product 1 may transmit information for informing the end of the operation to the mobile terminal 50. Then, the user interface 53 of the mobile terminal 50 may output received information or ending information corresponding to the received information.

According to the current embodiment, the operation method that is not capable of being selected through the electric product 1 may be selected through the mobile terminal 50. The electric product 1 may operate in the method that is received and selected through the mobile terminal 50. The user may operate the electric product 1 in the operation method except for the reference operation method as well as the reference operation method as necessary.

In summary, according to the current embodiment, the start button 22 may be an input unit for selecting one operation method of the plurality of operation methods. That is, the start button 22 may serve as an input unit for inputting an operation start command as well as an input unit for selecting the reference operation method.

For another example, two or more operation methods may be selected by using the start button 22. For example, when the start button 22 is pushed for a reference time or less, a first reference operation method may be selected, and simultaneously, the electric product may operate in the first reference operation method. When the start button 22 is pushed for a time that is above the reference time, a second reference operation method may be selected, and simultaneously, the electric product operate in the second reference operation method.

For another example, when the start button 22 is pushed once within the reference time, a first reference operation method may be selected, and simultaneously, the electric product may operate in the first reference operation method. When the start button 22 is pushed several times within the reference time, a second reference operation method may be selected, and simultaneously, the electric product operate in the second reference operation method.

According to the current embodiment, only a portion of the plurality of operation methods stored in the memory of the electric product may be selected through the user interface of the electric product, and an operation method that is not callable of being selected by the user interface may be selected through the mobile terminal. In this specification, although only a portion of the plurality of operation methods to be performed by the electric product is selected through the user interface, the present disclosure is not limited thereto. For example, only a portion of a plurality of functions of the electric product may be selected through the user interface.

The control object 40 may allow the electric product to perform a plurality of functions. A plurality of operation methods for performing the plurality of functions may be stored in the memory 32. Only a portion of the plurality of functions may be selected through the user interface 20.

A performance command for a function that is not capable of being selected through the user interface 20 of the electric product 1 may be received from the external device. The control unit 30 of the electric product 1 may control the control object so that the function selected through the user interface of the electric product 1 or the function corresponding to the performance command received from the external device are performed by the electric product. For example, the function of the electric produce 1 may includes a cleaning function, a diagnosis function, a security function, an alarm function, and a lighting function as well as the original function of the electric product, but is not limited thereto.

Although the washing machine is described as an example of the electric product in the forgoing embodiment, the description with respect to the washing machine may be equally applied to a dryer or dishwasher. That is, a user interface of the dryer or dishwasher may include a power button and a start button. Also, an operation method except for a reference operation method may be selected through the mobile terminal. The power button of the dryer or dishwasher may be omitted, and only the start button may be provided.

For another example, the electric product may be a cooker. For example, the cooker may include only a start button, time set button, and cancel button. Also, when the start button is selected, the cooker may operate in a reference operation method. Other operation methods that are capable of being performed by the cooker may be selected through the mobile terminal.

For another example, the cooker may include only the start button and cancel button. When the start button is selected, a predetermined time may be selected. An operation time of the cooker may gradually increase or decrease by the predetermined time according to the pushed number of start button. As necessary, the cooker may further include a button for selecting an intensity of heat.

For another example, the electric produce may be a refrigerator. The refrigerator may be an always-on product. Thus, it may not be necessary to provide a power button, unlike intermittently operating products such as the washing machine. Thus, the refrigerator may include only a temperature set button.

For another example, when the refrigerator includes a dispenser, the refrigerator may include only a kind selection button for selecting a kind of source (water or ices) to be dispensed from the dispenser and a temperature set button. Other functions that are capable of being performed by the refrigerator may be selected through the mobile terminal.

For another example, the electric product may include a water purifier. The water purifier may include only a kind selection button for selecting a kind (purified water, cold water, or hot water) of water to be dispensed. Other functions that are capable of being performed by the water purifier may be selected through the mobile terminal.

An electric product may comprise: a control object that allows the electric product to operate in one operation method of a plurality of operation methods; a memory in which the plurality of operation methods are stored; a user interface configured to select only a portion of the plurality of operation methods; a communication unit configured to communicate with an external device, the communication unit being capable of receiving a start command for an operation method, which is not capable of being selected through the user interface, of the plurality of operation methods from the external device; and a control unit configured to control the control object so that the electric product operates in the operation method selected through the user interface or the operation method corresponding to the start command received through the communication unit.

An electric product may comprise: a control object that allows the electric product to perform a plurality of functions; a memory in which an operation method for performing the plurality of functions is stored; a user interface configured to select only a portion of the plurality of functions; a communication unit configured to communicate with an external device, the communication unit being capable of receiving a command for performing a function, which is not capable of being selected through the user interface, of the plurality of functions from the external device; and a control unit configured to control the control object so that the electric product performs a function selected through the user interface or the function corresponding to the received command through the communication unit.

An electric product may include: a control object that allows the electric product to operate in a plurality of operation methods; a memory in which the plurality of operation methods are stored; a user interface configured to select at least one operation method of the plurality of operation methods; a communication unit configured to communicate with an external device, the communication unit being capable of receiving a start command for the at least one operation method of the plurality of operation methods from the external device; and a control unit configured to control the control object so that the electric product operates in the operation method selected through the user interface or the operation method corresponding to the start command received through the communication unit, wherein the number of operation method, which is capable of being selected by the user interface, of the plurality of operation methods is less than that of operation method, which is capable of being selected by the external device.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric product comprising:
   a control object to allow the electric product to operate in one of a plurality of operational modes, the plurality of operational modes comprising a first group of operational modes and a second group of operational modes;
   a memory to store information corresponding to the plurality of operational modes;
   a user interface installed on the electric product and only allowing selection of the first group of operational modes such that the user interface does not allow selection of the second group of operational modes regardless of the selection of the first group of operational modes;
   a communication module configured to receive a start command through a prescribed communication method for at least one operational mode, the at least one operational mode being an operational mode of the second group of operational modes; and
   a controller to control the control object so that the electric product operates in the at least one operational mode,
   wherein when the electric product operates in the first group of operational modes, the electric product is to perform a plurality of processes,
   wherein the user interface includes a start button,
   wherein a light emitting part for emitting light to the start button is installed in the electric product,
   wherein the light emitted from the light emitting part to the start button is to change in color according to each of the processes,
   when the start button is pushed once within a reference time, a first reference operation mode of the first group of operational modes is selected, and simultaneously, the controller controls the electric product to operate in the first reference operation mode,
   when the start button is pushed a first number of times within the reference time, a second reference operation mode of the first group of operational modes is selected based on the first number of times, and simultaneously, the controller controls the electric product to operate in the second reference operation mode, and
   when the start button is pushed a second number of times within the reference time, a third reference operation mode of the first group of operational modes is selected based on the second number of times, and simultaneously, the controller controls the electric product to operate in the third reference operation mode,
   wherein the plurality of processes includes a washing process, a rinsing process, and a dehydration process, wherein:
   when the electric product is to perform the washing process, the light emitted from the light emitting part to the start button is to be a first color,
   when the electric product is to perform the rinsing process, the light emitted from the light emitting part to the start button is to change to a second color, and
   when the electric product is to perform the dehydration process, the light emitted from the light emitting part to the start button is to change to a third color.

2. The electric product according to claim 1, wherein the electric product comprises a washing machine, and the user interface includes a power button to turn on/off the electric product.

3. The electric product of claim 1, wherein a number of operational modes of the first group of operational modes selectable through the user interface is less than a number of operational modes selectable through the communication module.

4. The electric product of claim 1, wherein a number of operational modes of the first group of operational modes is less than three operational modes of the plurality of operational modes.

5. The electric product of claim 1, wherein the first group of operational modes comprises most frequently used operational modes.

6. The electric product of claim 1, wherein an operational mode corresponds to one of an operational method and a function.

7. The electric product of claim 1, wherein the first number of times is greater than one, and the second number of times is greater than the first number of times.

* * * * *